United States Patent
Kaupert et al.

(10) Patent No.: US 9,142,959 B2
(45) Date of Patent: Sep. 22, 2015

(54) FUEL CELL SYSTEM

(75) Inventors: Andreas Kaupert, Esslingen (DE);
Valentin Notemann, Sonthofen (DE);
Karsten Reiners, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 476 days.

(21) Appl. No.: 13/547,541

(22) Filed: Jul. 12, 2012

(65) Prior Publication Data

US 2013/0017463 A1  Jan. 17, 2013

(30) Foreign Application Priority Data

Jul. 13, 2011  (DE) .................. 10 2011 079 104
Jul. 14, 2011  (DE) .................. 10 2011 079 169
Dec. 14, 2011  (DE) .................. 10 2011 088 566

(51) Int. Cl.
| | |
|---|---|
| H01M 8/06 | (2006.01) |
| H02J 1/10 | (2006.01) |
| B60L 11/18 | (2006.01) |
| H01M 8/00 | (2006.01) |
| H01M 8/04 | (2006.01) |
| H01M 10/46 | (2006.01) |
| H01M 16/00 | (2006.01) |
| H02J 7/34 | (2006.01) |
| H02J 1/00 | (2006.01) |

(52) U.S. Cl.
CPC .............. *H02J 1/102* (2013.01); *B60L 11/1868* (2013.01); *B60L 11/1885* (2013.01); *B60L 11/1887* (2013.01); *B60L 11/1894* (2013.01); *H01M 8/00* (2013.01); *H01M 8/04022* (2013.01); *H01M 8/0618* (2013.01); *H01M 8/0625* (2013.01); *H01M 8/0631* (2013.01); *H01M 10/46* (2013.01); *H01M 16/006* (2013.01); *H02J 7/34* (2013.01); *H01M 2250/20* (2013.01); *H02J 2001/004* (2013.01); *Y02E 60/50* (2013.01); *Y02T 10/7066* (2013.01); *Y02T 90/34* (2013.01); *Y10T 307/516* (2015.04)

(58) Field of Classification Search
CPC ................... H01M 8/04022; H01M 8/04097; H01M 8/0618; H01M 8/04074
USPC ....................................................... 429/423
See application file for complete search history.

(56) References Cited

U.S. PATENT DOCUMENTS

| | | |
|---|---|---|
| 7,367,996 B2 | 5/2008 | Clawson et al. |
| 2002/0028362 A1 | 3/2002 | Prediger et al. |
| 2009/0258262 A1 * | 10/2009 | Kaupert .................. 429/17 |

FOREIGN PATENT DOCUMENTS

DE    10 2009 030 236 A1    12/2010

* cited by examiner

*Primary Examiner* — Jane Rhee
(74) *Attorney, Agent, or Firm* — McGlew and Tuttle, P.C.

(57) ABSTRACT

A fuel cell system (1) has a fuel cell (2) and a reformer (33). A careful operation of the fuel cell system (1), in particular during a start-up of the fuel cell system (1), is obtained when the fuel cell system (1) is equipped with a reformer heating burner (additional burner) (11). The heat of reformer heating burner waste gas of the reformer heating burner (11) is fed to the reformer (9).

18 Claims, 2 Drawing Sheets

US 9,142,959 B2

FUEL CELL SYSTEM

CROSS REFERENCE TO RELATED APPLICATIONS

This application claims the benefit of priority under 35 U.S.C. §119 of German Patent Application DE 10 2011 079 104.3 filed Jul. 13, 2011, German Patent Application DE 10 2011 079 169.8 filed Jul. 14, 2011, and German Patent Application DE 10 2011 088 566.8 filed Dec. 14, 2011, the entire contents of which are incorporated herein by reference.

FIELD OF THE INVENTION

The present invention relates to a fuel cell system with a reformer and a reformer for such a fuel cell system.

BACKGROUND OF THE INVENTION

A fuel cell system comprises a fuel cell, which as a rule is constructed as a fuel cell stack. The fuel cell acts as galvanic cell, which converts the chemical energy developing during the chemical reaction of hydrogen and oxygen into water into electric energy, and making it available to electric consumers in the form of an electric voltage. To this end, the fuel cell has an anode side and a cathode side, which comprise at least one anode or at least one cathode. As a cathode gas, oxygen-containing gases, in particular air, are usually employed. As an anode gas, hydrocarbons or hydrocarbon-containing gases are frequently employed. For generating an anode gas, the fuel cell system usually comprises a reformer, which generates a reformate gas as anode gas, which can be fed to the anode side by means of a reformate gas line. To this end, a chemical reaction of a fuel with an oxidant gas takes place at high temperatures, as a consequence of which the reformate gas is created. The reformer can additionally comprise a catalytic converter, which realizes the conversion of the oxidant gas and the fuel into the reformate gas. As oxidant gas, air is frequently employed, while fossil fuels are employed as fuel. During a starting operation of the reformer, in particular during a cold start of the reformer, undesirable by-products are created in the reformate gas, which can be deposited on the anode side, in particular on the anode of the fuel cell and thus reduce the efficiency of the fuel cell. This deposition is amplified in particular in that the anode side during the starting operation of the fuel cell system or during the cold start also has low temperatures, which are below an operating temperature.

SUMMARY OF THE INVENTION

The present invention deals with the problem of providing an improved or at least alternative embodiment for a fuel cell system of the type mentioned at the outset, which is characterized in particular by an improved starting operation of the fuel cell system.

According to the invention, a fuel cell system is provided comprising a fuel cell with an anode side comprising an anode and cathode side comprising a cathode. A reformer is provided for generating reformate gas. A fuel line supplies the reformer with reformer fuel and a reformer air line supplies the reformer with reformer air. A reformate gas line is provided for feeding the reformate gas to the anode side. A reformer heating burner device (also termed additional burner device) is provided for generating additional burner waste gas. A reformer feeding device is coupled to the reformer and transfers heat of reformer heating burner device waste gas to the reformer.

The present invention is based on the general idea of equipping a fuel cell system with an additional burner device and to utilize the additional burner waste gas of the additional burner device for heating up the reformer, in particular during a starting operation or during a cold start of the reformer or of the fuel cell system. The warm additional burner waste gas can thus be fed to the reformer in a heat-transferring manner. The invention in this case utilizes the knowledge that undesired by-products within a reformate gas generated by the reformer, are conditional upon the low temperature of the reformer in particular during the staring operation or during the cold start. The concentration of such by-products in the reformate gas greatly decreases when an operating temperature of the reformer is reached. Since these by-products can settle on an anode side, in particular on an anode, of a fuel cell of the fuel cell system, this results in a reduced efficiency of the fuel cell system. The production of these by-products in the reformate gas is counteracted according to the invention in that the reformer during the starting operation is heated up by means of the additional burner device or the additional burner waste gas. This heating-up of the reformer in this case can take place prior to a start of the corresponding chemical reactions within the reformer. This means, in particular, that the heating-up of the reformer can take place even before a start of the reformer, in particular of a catalytic converter of the reformer.

The additional burner device preferentially comprises at least one additional burner (at least one reformer heating burner), which produces the additional burner waste gas through a combustion process. For the simplified description, the term additional burner is used in the following both for the additional burner device as well as for the additional burner (and the term reformer heating burner is used for the reformer heating burner device as well as for the reformer heating burner).

In accordance with the inventive idea, the fuel cell system comprises the fuel cell. Apart from the anode, the fuel cell comprises at least one cathode on a cathode side. The fuel cell system furthermore comprises the reformer for generating and feeding the reformate gas, which can be fed to the anode side by means of a reformate gas line. For transferring the heat of the additional burner waste gas to the reformer, the fuel cell system additionally comprises a reformer feeding device. To this end the reformer feeding device is coupled to the reformer in particular in a heat-transferring manner. The heat transfer in this case is not effected by force through an entry of the additional burner waste gas in the reformer. The heat transfer can rather be realized also in that the additional burner waste gas flows by on/around the reformer.

With a preferred embodiment, the reformer feeding device comprises an inflow and a return. The inflow of the reformer feeding device serves for feeding the additional burner waste gas to the reformer, while the return of the reformer feeding device serves for the return of the additional burner waste gas from the reformer. To this end, the inflow and the return are practically fluidically interconnected, wherein this connection is realized preferentially in the region of the reformer or near the reformer. In this case, this also means that the feed or the discharge of the additional burner waste gas to or from the reformer does not necessarily mean that the additional burner waste gas enters the reformer. Embodiments are preferred, wherein the additional burner waste gas flows past the outside of a reformer, i.e. in particular a housing of the reformer. A possible realization therefore is to arrange the inflow and/or the return of the reformer feeding device, in particular in the region of the reformer, in a hose-like design and in a manner enveloping the reformer.

According to a further preferred embodiment, the reformer is at least partially surrounded by a heating jacket through which a flow can flow. The reformer is consequently and at least partially enveloped by the heating jacket through which a flow can flow. The heating jacket is furthermore coupled to the reformer in a heat-transferring manner. To this end, the heating jacket is embodied for example as a hollow body enveloping the reformer, wherein a wall of the heating jacket adjacent to the reformer contacts the reformer. Alternatively an embodiment is conceivable, wherein the housing of the reformer, in particular an outer wall of the reformer, forms an inner wall of the heating jacket. For realizing the through-flow capability, the heating jacket additionally comprises at least one opening, which serves as an inlet and/or as an outlet.

The heating jacket is preferentially fluidically separated from the reformer. This means that a path of the additional burner waste gas heating the reformer is fluidically separated from a path of the reformate gas. This fluidic separation in this case applies also to educt feeds to the reformer. This means, in particular, that a fuel feed to the reformer or an oxidant gas feed to the reformer in each case are fluidically separated from the reformer feeding device.

With an advantageous further development, the reformer feeding device is fluidically connected to the heating jacket through which a flow can flow and thus transfers the heat of the additional burner waste gas to the reformer. To this end, the inflow and the return of the reformer feeding device for example are fluidically connected to the heating jacket through which a flow can flow. These connections are preferentially realized via two openings of the heating jacket. This means that the inflow is fluidically connected to a first opening and the return is fluidically connected to a second opening. The additional burner waste gas thus flows via the inflow to the reformer or to the heating jacket and via the return away from the reformer or from the heating jacket, as a result of which a heat transfer to the reformer is ensured. If the openings of the reformer and thus the fluidic connections of the inflow and of the return with the heating jacket are additionally arranged on the opposite sides of the heating jacket, this leads to an improved heat transfer to the reformer, since a path of the additional burner waste gas within the heating jacket is enlarged or maximized. To this end, the heating jacket, in particular the hollow space of the heating jacket, can be expanded with guiding elements, which define a predetermined path of the additional burner waste gas. Naturally, the heating jacket can also comprise a plurality of first openings and/or a plurality of second openings, each of which are fluidically connected to the inflow or the return.

For feeding a cathode gas or a fuel cell air to the cathode side of the fuel cell, the fuel cell system with a further embodiment comprises a fuel cell air line. In order to render the heat of the additional burner waste gas also feedable to the cathode gas, the fuel cell system with a preferred embodiment comprises an additional burner heat transfer unit. The additional burner heat transfer unit is coupled in a heat-transferring manner to an additional burner waste gas line or simple additional waste gas line or arranged within the additional waste gas line or in addition connected to the fuel cell air line in a heat-transferring manner. The additional waste gas line serves for discharging the additional burner waste gas produced by the additional burner. Accordingly, the additional waste gas line discharges in particular a part of the additional burner waste gases, which is not utilized for heating-up the reformer and/or the additional burner waste gas returned from the reformer.

With a further preferred embodiment, the reformer comprises in its interior a mixing chamber and a catalytic converter that is adjacent to the mixing chamber. In the mixing chamber, a reformer fuel is mixed with reformer air and combusted or preheated, while the conversion of the mixture into reformatee gas is effected by means of the catalytic converter. Practically, the mixing chamber is arranged upstream of the catalytic converter. Preferably, the heating jacket surrounds the reformer in the region of the catalytic converter and thus predominantly warms or heats the catalytic converter. Here, the mixing chamber is consequently warmed by the heat transfer from the catalytic converter or by the heat transfer of the region surrounding the heating jacket.

According to a further embodiment, a mixing jacket surrounds the reformer in the region of the mixing chamber. The mixing jacket is additionally fluidically connected to a reformer air line for supplying the reformer with reformer air. The mixing jacket serves to the pre-conditioning of the reformer air and is practically fluidically connected to the reformer, in particular the mixing chamber. This fluidic connection is realized by means of at least one mixing jacket outlet, which is arranged on the inside of the mixing jacket facing the reformer or the mixing chamber. Accordingly, the fluidic connection to the reformer air line can be realized on the outside of the mixing jacket facing away from the reformer or the mixing chamber. Preferably, the mixing jacket comprises a plurality of mixing jacket outlets, which are evenly distributed along the circumferential direction of the reformer or of the mixing chamber, so that the reformer air flows evenly or homogenously into the mixing chamber.

In its interior, the reformer can also comprise an evaporator chamber, which is arranged on the side of the mixing chamber facing away from the catalytic converter or upstream of the mixing chamber. The evaporator chamber serves for evaporating the mostly liquid fuel and is practically fluidically connected to a fuel line for feeding the fuel to the reformer.

Preferred is an embodiment, wherein the inflow of the reformer feeding device on the one hand is fluidically connected to the additional waste gas line and on the other hand to the heating jacket through which a flow can flow and which envelopes the reformer. The fluidic connection to the additional waste gas line is preferentially realized upstream of the additional burner transfer unit, wherein the term upstream in this case is given with respect to the flow direction of the additional burner waste gas within the additional waste gas line. The inflow of the reformer feeding device thus conducts the additional burner waste gas to the reformer upstream of the additional burner heat transfer unit. Alternatively or additionally, the return of the reformer feeding device is fluidically connected on the one hand to the heating jacket and on the other hand to the additional waste gas line. The fluidic connection between the return and the additional waste gas line is preferentially realized downstream of the additional burner heat transfer device. The return thus conducts the additional burner waste gas, in particular the additional burner waste gas fed in by the inflow, from the heating jacket or from the reformer back to the additional waste gas line. Here, embodiments are preferred wherein both the return as well as the inflow of the reformer feeding device are realized in this manner.

With an advantageous further development, the heat of the additional burner waste gas can be fed to the fuel cell. To this end, the fuel cell system can comprise a branch, which branches off the additional burner waste gas from the additional waste gas line, feeding it back again to the additional waste gas line. The branch is additionally coupled to the fuel cell in a heat-transferring manner. This heat-transferring coupling is for example realized by means of an end plate or termination plate of the fuel cell, which terminates the fuel cell and is coupled to the branch in a heat-transferring manner.

The branching-off or return of the additional burner waste gas through the branch in this case is not necessarily effected directly from the additional waste gas line. In particular, the branching-off and/or the return can be effected via the reformer feeding device.

With a further embodiment, the fuel cell system comprises a further fuel line in addition to the fuel line, which supplies the additional burner with an additional burner fuel. The fuels of the reformer and of the additional burner can generally be different. However, an embodiment is preferred, wherein the reformer fuel and the additional burner fuel are identical. Consequently, the reformer and the additional burners consume the same fuel or convert the latter. Practically and preferentially, the common fuel in this case can be taken from a common container, in particular a tank or a pressure vessel. The fuel additionally corresponds preferably to the fuel of a combustion engine of a vehicle in or on which the fuel cell system is arranged.

The same applies to an air supply line for supplying the additional burner with air as oxidant gas. This means, the oxidant gas of the additional burner and the reformer air are identical and in particular, air. In addition, the feeding of the air to the additional burner or to the reformer can be effected through a common delivery device, for example a pump.

It is pointed out that the additional burner can be practically regulatable or controllable. The additional burner can thus be operated in particular upon demand. Thus, the transfer of the heat of the additional burner waste gas to the reformer takes place merely upon demand, in particular during the starting operation of the fuel cell system. Accordingly, the additional burner can be switched off during a normal operation of the fuel cell system. In particular, a control device can be provided, which controls or regulates the additional burner. It is also conceivable, in addition or optionally, to arrange a valve in the reformer feeding device, which regulates a metering of the flow of the additional burner waste gas to the reformer, in particular to the heating jacket.

According to an operating method for the start or cold start of the fuel cell system, residual gas, which is contained in gas-conducting components of the fuel cell system, can be additionally circulated from the anode side of the fuel cell to the reformer and from the reformer to the anode side, in particular for as long as the anode or anode side of the fuel cell is below an anode limit temperature. In other words, in a section of the fuel cell system, residual gas is delivered in a circuit between the reformer and the anode side of the fuel cell. Since the fuel cell air preheated with the help of the additional burner heats up the cathode side of the fuel cell, this automatically results also in a heating-up of the anode side, so that a heat transfer to the residual gas delivered in the circuit is likewise effected. This circulating residual gas transports the heat to the reformer where it brings about preheating of the reformer and in particular of the catalytic converter of the reformer.

The starting procedure introduced here thus simultaneously realizes a preheating of the fuel cell and of the reformer with the help of the additional burner. Because of this, the reformer was ready for operation more rapidly, which shortens the starting procedure as a whole, wherein at the same time a material-saving procedure is realized so that damages of the individual components due to excessive thermal load can be avoided.

By using the additional burner, a residual gas burner can be designed for example to a rated operation of the fuel cell, since the additional burner can be switched off at the end of the cold starting operation. Consequently, an improved efficiency results for the rated operation of the fuel cell system.

According to an advantageous embodiment, the reformer can be at least temporarily operated in a reformer operating state prior to reaching a predefined (first) anode limit temperature, which for example can be around approximately 250° C. Such a reformer operation can be realized with adequately high temperature for example in that fuel and reformer air with a corresponding air number are temporarily fed to the reformer. In this manner, any oxygen continuing to be contained in the circulating residual gas can be converted or consumed. It is important that during this temporary reformer operating state of the reformer the residual gas circulation is continued in a circuit between anode side and reformer. In this way, the entire oxygen gas contained in the residual gas can be reliably consumed. This temporary reformer operating state is carried out in order to be able to continue to circulate the residual gas in a circuit even with rising temperatures, without damaging the anode of the fuel cell in the process. At higher temperatures, for example from 300° C., the risk of permanent damage of the anode through contact with oxygen increases significantly.

If a warm start of the reformer with immediate reformer operating state should not be possible, a cold start of the reformer has to be performed, wherein it is initially operated in a burner operating state. According to a further development of the starting procedure introduced here, the reformer can thus be operated in an operating state below a predefined limit temperature of the catalytic converter of the reformer, wherein reformer air is fed to the reformer and reformer waste gas formed in the reformer is discharged via the waste gas line. The reformer then serves as additional heat source, namely as additional burner for heating-up the catalytic converter. As soon as the catalytic converter limit temperature has then been reached, which can be between 350° C. and 900° C., the operation of the reformer can be changed to the reformer operating state.

For as long as the temperature on the anode side lies below a re-oxidation limit, which for example can be around 300° C., the gas coming from the reformer can be conducted through the anode side. Optionally, the gas coming from the reformer can be conducted to the waste gas line bypassing the anode side, as a result of which contact of the anode with oxygen carried along in the gas coming from the reformer, can be avoided.

Irrespective of whether the reformer waste gas flows through or bypasses the anode side, the reformer waste gas can be used for preheating fuel cell air.

As soon as the catalytic converter of the reformer has reached its predefined operating temperature, which for example can be around 900° C., the reformer can be operated particularly effectively in its reformer operating state. The reformate gas usually contains no oxygen and can be conducted through the anode side, which additionally results in a heating-up of the fuel cell. In addition to this, the reformate gas can be converted in the residual gas burner together with the fuel cell air discharged from the cathode side, i.e. combusted, as a result of which additional heat is liberated, which can be utilized for preheating the fuel cell air.

The additional burner can now be deactivated as soon as the residual gas burner takes over the preheating of the fuel cell air or as soon as a predefined (second) anode limit temperature or anode operating temperature has been reached.

With another embodiment it can be provided to again switch off the reformer when a predefined further (third) anode limit temperature has been reached and to now continue to circulate oxygen-free residual gas between anode side and reformer. This third anode limit temperature is significantly below the second anode limit temperature or below the anode operating temperature. The third anode limit temperature however is also above the first anode limit temperature. Below the anode operating temperature, which can be around 650° C. for example, there is a risk of soot formation or soot deposits on the anode of the fuel cell. By switching off the reformer, this risk can be substantially reduced, since the temperature range that is critical to the soot formation can be evaded.

According to an advantageous further development, the reformer can then be switched on again when a predefined further (fourth) anode limit temperature has been reached and then be operated in the reformer operating state immediately. The fourth anode limit temperature at any rate is higher than the third anode limit temperature. The third anode limit temperature can be around approximately 350° C. for example. The fourth anode limit temperature can be around approximately 650° C. For this reason, it can be selected in particular identical in size to the previously mentioned second anode limit temperature or the anode operating temperature. The renewed switching-on of the reformer in the presence of the fourth anode limit temperature makes possible a warm start of the reformer, i.e. an immediate operating of the reformer in the reformer operating state. With the comparatively high temperatures that are now present, the risk of soot formation or soot deposits on the anode are substantially reduced.

As soon as the anode side or the fuel cell then has reached a minimum temperature, the fuel cell can be put into operation. This is then the end of the starting procedure.

According to another advantageous embodiment, air from a bypass air line, which bypasses the residual gas heat transfer unit arranged in the fuel cell air line, can be introduced into the fuel cell air line downstream of the residual gas heat transfer unit for regulating a temperature of the fuel cell. The residual gas heat transfer unit can interact with the exhaust gas flow of the residual gas burner in order to heat up the fuel cell air. The additional heat transfer unit can interact with the additional burner in order to preheat the fuel cell air with the hot additional burner waste gas. If it is necessary to reduce or delimit a temperature of the fuel cell, e.g. the temperature of the electrolyte or a cathode temperature or an anode temperature in order to avoid overheating of the respective component of the fuel cell, it is now possible to feed cooling air drawn in from the environment to the fuel cell on the cathode side subject to bypassing both heat transfer units. This is made possible with the help of the bypass line, which connects the bypass air line to the fuel cell air line between the two heat transfer units.

Practically, the electric voltage or electric current generated by such a fuel cell system can be fed to electrical consumers. To this end, the fuel cell system can for example be part of an arrangement and at least comprise a system battery that is distinct from a consumer network battery of a network system of the arrangement, wherein the system battery has an electrical system voltage at a system voltage level. The system battery in this case acts in particular as a storage unit or as a buffer between a fuel cell of the fuel cell system and electrical consumers of the fuel cell system or the arrangement, wherein the fuel cell generates a cell voltage at a cell voltage level by means of fuel cell elements. The supplementation of the fuel cell system through the system battery now results in particular in that the system voltage made available by the system battery can now be fed to system consumers, that is electrical consumers of the fuel cell system. Thus, starting of the fuel cell system without feeding in external electric energy can also be carried out for example. If the system is a fuel cell system with a solid oxide fuel cell (SOFC), heating-up of the components of the fuel cell system, in particular heating-up of electrodes or an anode and/or a cathode of the fuel cell, is possible in particular during the starting operation without external feeding in of electric energy or the electric energy required for the starting operation is reduced. If the fuel cell system has a low-temperature fuel cell, for example PEM fuel cell, the starting operation, in particular the supply of the system consumers with electrical voltage, can be realized without external feeding-in of electric energy. In addition, the system voltage can also be fed to other electrical consumers, in particular the network system of the arrangement and thus initial consumers.

Accordingly, the fuel cell system comprises a voltage conversion device, which converts the cell voltage level to the system voltage level and/or the system voltage level to the cell voltage level. The voltage converter device thus serves in particular for the purpose of making the cell voltage generated by the fuel cell capable of being fed to the system battery. Alternatively or additionally, the voltage converter device can make the system voltage present on the system battery capable of being fed to the fuel cell. To this end, the voltage converter device is practically connected electrically to the fuel cell and the system battery, wherein the respective electrical connections do not necessarily run directly from the voltage converter device to the fuel cell or to the system battery. This means in particular that other devices or components can be connected between the fuel cell, the voltage converter device and the system battery. The term network system in this case does not at all mean that the network system does not comprise an energy supply or electric voltage supply that is separated from the fuel cell system. The network system can rather have an energy supply that is distinct from the fuel cell system or be connected to such a supplier.

The electrical connection to the fuel cell is preferentially and practically realized by means of the electrodes of the fuel cell. Accordingly, the cell voltage is tapped off the electrodes or the system voltage preferentially fed to the electrodes.

As system consumers of the fuel cell system, reference is made here for example to air supply devices, fuel supply devices, a heater, control devices as well as valves and the like.

For supplying electrical secondary consumers, i.e. consumers which do not belong to the arrangement, the system battery is additionally connected to at least one additional voltage converter, wherein the respective voltage converter matches the system voltage present on the system battery to an associated additional voltage level. The respective additional voltage converter makes the associated additional voltage at the associated additional voltage level available to the secondary consumer or the secondary consumers, wherein the respective additional voltage level is above or below the system voltage level.

For the electrical supply of the consumer network, a consumer voltage converter electrically connected to the system battery is additionally provided, which adapts the system voltage present on the system battery to the consumer network voltage level. The consumer voltage converter consequently serves the purpose of making available to the network system the electrical voltage generated by the fuel cell system. The consumer network voltage level is above or below the system voltage level, wherein the consumer voltage converter increases or reduces the system voltage level to the consumer network voltage level.

It is pointed out that the cell voltage generated by the fuel cell and the system voltage present on the system battery are direct voltages as a rule. Accordingly and practically, the system consumers are suitable for operation with a direct voltage. Thus, the voltage converter device preferentially comprises a voltage converter device preferentially at least one direct voltage converter, i.e. in particular a so-called "DC/DC converter". If the consumer network voltage is also a direct voltage, the consumer voltage converter can likewise comprise such a direct voltage converter.

It is noted, in addition, that the fuel cell as a rule is formed as a stack of fuel cell elements. With a series connection of the individual fuel cell elements, the cell voltage of the fuel cell is consequently produced as the sum of the electrical voltage generated by the individual fuel cell elements. If the cell voltage with an embodiment of the arrangement amounts to 42V for example and the respective fuel cell element each produces an electrical voltage of 0.7V, the fuel cell has 60 fuel cell elements connected in series. However, the electrical voltage generated by the respective fuel cell depends, among other things, also on the output power, i.e. on a load. When the voltage of the respective fuel cell element during a full load drops for example to 0.6V, the cell voltage correspondingly decreases to 36V. If the voltage of the respective fuel cell element during a no-load state increases to 1.0V, the cell voltage rises to 60V accordingly. Thus, the voltage converter device also serves the purpose in particular to offset these fluctuations of the cell voltage and convert the load-dependent cell voltage and thus the load-dependent cell voltage level to the substantially constant system voltage level.

Preferred is an embodiment, wherein the consumer network battery similar to the system battery functions as a storage unit or as a buffer, by means of which the initial consumers are electrically supplied.

According to a further preferred embodiment, the fuel cell system comprises an electric charging device. The charging device in particular serves for the purpose of charging the system battery by means of the electrical cell voltage generated by the fuel cell. The charging device thus allows in particular, to store the electrical energy generated by the fuel cell by means of the system battery. The electric energy stored thus can now be fed to the system consumers in particular during a starting operation of the fuel cell system, by means of which starting of the fuel cell system that is independent from the outside, i.e. from external voltage or electric energy suppliers, is guaranteed. Here, the charging device is preferentially arranged between the voltage converter device and the system battery. The charging device can also be arranged within the voltage converter device or be part of the voltage converter device. Alternatively, the charging device can be arranged on the system battery or be a part of the system battery.

With a further preferred embodiment, at least one of the additional voltage converters comprises an inverter. At least one of the additional voltage converters is consequently designed in such a manner that it adapts the direct voltage-like system voltage present on the system battery to the corresponding additional voltage level, converting it into an alternating voltage. This now serves in particular for the electrical supply of secondary consumers, which are operated with an alternating voltage. The secondary consumers in this case can be external consumers, which are operated with conventional domestic voltages. The additional voltage in particular amounts to 220V or 110V. Reference as examples for such secondary consumers here is made to refrigerators and cooler boxes, TV sets or displays as well as electrically operated air conditioners, in particular air conditioning compressors.

The respective additional voltage levels can be both below as well as above the system voltage level. Embodiments are conceivable, for example, wherein an additional voltage level each is above and an additional voltage level below the system voltage level. Accordingly, the arrangement comprises two additional voltage converters, wherein one of the additional voltage converters increases the system voltage level to the first additional voltage level and thus renders the first additional voltage capable of being fed to first secondary consumers while the second additional voltage converter reduces the system voltage level to the second additional voltage level, rendering it capable of being fed to second secondary consumers. Embodiments, wherein at least one such additional voltage converter increases the system voltage level to an additional voltage level with a high voltage, are also preferred. Such a high voltage serves for example for the operation of air conditioners.

Embodiments, wherein such an additional voltage converter merely comprises an inverter of the said type, are possible alternatives. This additional voltage converter thus converts the system voltage present on the system battery merely into an alternating voltage.

With a further preferred embodiment, the system voltage present on the system battery is capable of being fed to electrodes of the fuel cell and thus the anode of the fuel cell. Feeding the system voltage present on the system battery to the fuel cell serves the purpose, in particular, of protecting the electrodes and in particular the anode from oxidation. This so-called "protective voltage" is practical, in particular, as is known for example from US 2002/0028362 A1, when the anode is exposed to oxidizing conditions. To this end, the fuel cell system, in particular the voltage converter device, is designed in such a manner that the system voltage or the system voltage level is capable of being fed to the electrodes of the fuel cell. Feeding the system voltage to the electrodes or to the anode can be preferentially controlled and regulated. Such a transfer of the system voltage to the electrodes can thus be activated in particular upon demand, for example during the start or during a running down of the fuel cell system and subsequently re-activated. Optionally, the voltage converter device is additionally designed in such a manner that it can convert the system voltage at the system voltage level into an electrical voltage at another electrical voltage level. In particular, this now serves the purpose of adapting the voltage to be fed to the electrodes to the respective conditions, in particular the oxidizing conditions on the anode side. To this end, the fuel cell system preferentially comprises a device, which allows a determination of the relevant conditions on the electrodes and in particular on the anode side. Such a device can comprise in particular a temperature measuring device and a device for determining the oxygen concentration or the oxygen ion concentration. In addition, a control device can be provided, which regulates and controls the protective voltage as a function of the relevant parameters.

It is pointed out that the supplementation of the fuel cell system with the voltage converter device and the consumer voltage converter as well as the at least one additional voltage converter also increases the economy of the fuel cell system or the associated arrangement. This is the case, in particular, because these components of the invention are thoroughly known and allow a simple as well cost-effective assembly and manufacture.

With a preferred embodiment, the arrangement is part of a vehicle, in particular of a motor vehicle. In this case the network system can correspond to an on-board system of the vehicle. Thus, the initial consumers are in particular control units, glow bulbs as well as a radio of the vehicle. Consequently, the consumer network battery is an on-board system battery of the motor vehicle. The cell voltage generated in the case of an application in a vehicle as a rule is between 42 and 100V, while the system voltage preferentially has a value of 24V, as a result of which the system consumers are also operated at a system voltage level of 24V. Furthermore, the on-board system voltage as a rule has a value of 12V, as a result of which the initial consumers are operated on a network system voltage level of 12V. In this case, the voltage converter device converts the cell voltage generated by the fuel cell to the system voltage level of 24V and feeds the converted voltage to the system battery. Furthermore, the consumer voltage converter in this case converts the system voltage of 24V to the consumer network voltage level of 12V and feeds the converted voltage to the on-board system, in particular to the on-board system battery. The consumer voltage converter is thus designed in particular as a downward converter. Here, the on-board system battery, similar to the system battery, functions as a storage unit or as a buffer, from which the initial consumers are electrically supplied. A conversion of the system voltage to the high-voltage level or into an alternating voltage by an additional voltage converter of the said type can serve for the operation of secondary consumers with a corresponding voltage requirement, such as for example an air conditioner of the vehicle or an air conditioning compressor as well as a TV set. This is possible, in particular, even when the vehicle, in particular a combustion engine of the vehicle, cannot be operated and the fuel cell system thus ensures a corresponding supply of the consumers. The further additional voltage converter can additionally make available a conventional domestic voltage in order to operate for example a TV set, a coffee maker etc.

It is clear that the values of the respective voltages or voltage levels stated here do not constitute any restrictions of the present invention. For this reason, other values of the respective voltages are also conceivable. Furthermore, the respective voltages can also be an alternating voltage, without leaving the scope of this invention.

Such an arrangement can also be part of a stationary system. Here, the system battery, as already mentioned, serves in particular for the independent starting of the fuel cell system and the purpose of rendering the system voltage capable of being fed to electrodes of the fuel cell in particular as protective voltage.

It is noted that a reformer with a heating jacket of the said type for such a fuel cell system as such also belongs to the scope of this invention. The reformer can additionally comprise a mixing jacket and/or an evaporator chamber of the said type.

It is to be understood that the features mentioned above and still to be explained in the following cannot only be used in the respective combination stated, but also in other combinations or by themselves without leaving the scope of the present invention.

Preferred exemplary embodiments of the invention are shown in the drawing and are explained in more detail in the following description, wherein same reference characters refer to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
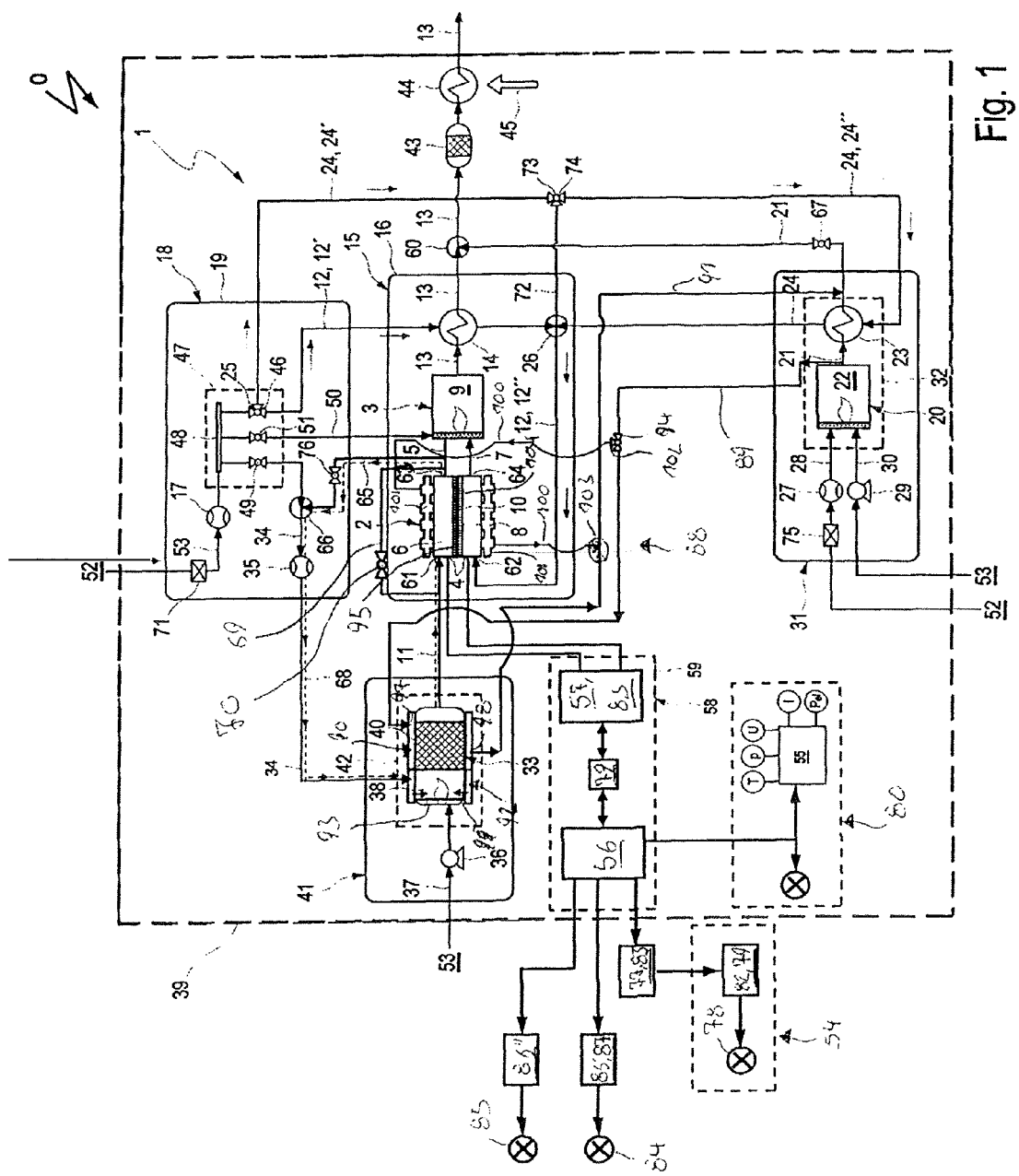
FIG. 1 is a circuit diagram and highly simplified view of an embodiment of an arrangement having a fuel cell system and electrical consumers according to the invention.

Referring to the drawings in particular, FIG. 1 shows an arrangement 0 with a fuel cell system 1, which can be arranged in a vehicle or in any other mobile or stationary application as only or as additional electric source of energy with a fuel cell 2 and a residual gas burner 3. During operation, the fuel cell 2 generates electric current from anode gas and cathode gas, which can be tapped off via electrodes 4. The fuel cell 2 is preferably configured as SOFC fuel cell. The residual gas burner 3 in operation, converts anode waste gas with cathode waste gas generating burner waste gas. Here, the conversion can be carried out with open flame. A catalytic conversion is used as an alternative.

An anode waste gas line 5 connects an anode side 6 of the fuel cell 2, comprising at least one anode 95, to the residual gas burner 3. A cathode waste gas line 7 connects a cathode side 8 of the fuel cell 2, comprising at least one cathode 104, to the residual gas burner 3. The conversion of the fuel cell waste gas then takes place in a combustion chamber 9 of the residual gas burner 3. The residual gas burner 3 can form a structurally integrated unit with the fuel cell 2. The anode waste gas line 5 and the cathode waste gas line 7 are then internal lines or paths.

In the fuel cell 2, an electrolyte 10 separates the anode side 6 from the cathode side 8. By way of a reformate gas line 11 or an anode gas line 11, anode gas is fed to the anode side 6 of the fuel cell 2. Cathode gas is fed to the cathode side 8 of the fuel cell 2 via a fuel cell air line 12. The cathode gas preferably is air. A burner waste gas line 13 discharges the burner waste gas generated by the residual gas burner 3 from the residual gas burner 3 or from its combustion chamber 9. Incorporated in this burner waste gas line 13 is a residual gas heat transfer unit 14, which is additionally incorporated in the fuel cell air line 12. The residual gas heat transfer unit 14 generates a media-separated heat-transferring coupling between the fuel cell air line 12 and the burner waste gas line 13. The residual gas heat transfer unit 14 in this case can be structurally integrated in the residual gas burner 3.

In the example, the fuel cell system 1 is equipped with a fuel cell module 15, which comprises the fuel cell 2, the residual gas burner 3 and the residual gas heat transfer unit 14. Furthermore, this fuel cell module 15 is equipped with a thermally insulating envelope 16, which encloses the components of the fuel cell module 15.

The fuel cell system 1 is additionally equipped with an air delivery device 17, which for example can be a blower or a compressor or an electrically operated turbocharger or a pump. In operation, this air delivery device 17 feeds air as cathode gas to the fuel cell 2 via the fuel cell air line 12. The air delivery device 17 in this case is part of an air supply module 18, which has its own thermally and/or acoustically insulating envelope 19, in which the air delivery device 17 is arranged. The air delivery device 17 can preferentially be equipped with a filter device 71, in order to filter particles and/or aerosols out of the delivered air.

The fuel cell system 1 is additionally equipped with an additional burner device (reformer heating burner device) 20 or an additional burner (reformer heating burner) 20, which is configured so that in operation it converts air with an additional burner fuel or simply fuel into additional burner waste gas (reformer heating burner waste gas). This additional burner waste gas in the process is discharged via an additional burner waste gas line 21 or additional waste gas line 21 in brief from the additional burner 20 or from a combustion chamber 22 of the additional burner 20. The additional waste gas line 21 preferentially contains a shut-off organ 67 for decoupling the additional burner 20 during a normal operation of the fuel cell system 1, during which the additional burner 20 is switched off. The shut-off organ 67 then acts as a non-return barrier. In this additional waste gas line 21, an additional burner heat transfer unit 23 or additional heat transfer unit 23 in brief is incorporated. In addition, the additional heat transfer unit 23 is incorporated in a bypass air line 24. The additional heat transfer unit 23 thus generates a media-separated heat-transferring coupling between the additional waste gas line 21 and the bypass air line 24. The additional heat transfer unit 23 in this case can be structurally integrated in the additional burner 20.

The bypass air line 24 bypasses the residual gas heat transfer unit 14 on the air side. To this end, a bypass air line 24 is connected to the fuel cell air line 12 on the input side via a removal point 25 between the air delivery device 17 and the residual gas heat transfer unit 14. On the output side, the bypass air line 24 is connected to the fuel cell air line 12 via an introduction point 26 between the residual gas heat transfer unit 14 and the fuel cell 2. A first section of the fuel cell air line 12, which leads from the air delivery device 17 to the introduction point 26, is designated 12' in the following, while a second section of the fuel cell air line 12 leading from the introduction point 26 to the fuel cell 2 or to the cathode side 8 is designated 12" in the following.

According to the embodiment shown here, a bypass line 72 can be optionally provided, which connects a removal point 73 of the bypass air line 24 arranged upstream of the additional heat transfer unit 23 to the introduction point 26, i.e. to the fuel cell supply air line 12. This bypass line 72 thus makes possible a bypassing of the additional heat transfer unit 23 within the bypass air line 24. A first section of the bypass air line 24, which leads from the removal point 25 as far as to the further removal point 73, is designated 24' in the following, while a second section of the bypass air line 24 leading from the further removal point 73 as far as to the introduction point 26 is designated 24" in the following. For controlling the bypass line 72, a further valve 74 can be provided, which in the example is practically arranged on the further removal point 73.

In normal operation of the fuel cell system 1, i.e. with switched-off additional burner 20, preheating of the fuel cell air exclusively takes place via the residual gas heat transfer unit 14. In certain operating situations it can be required to avoid a further temperature increase of the fuel cell 2 or achieve a cooling-down of the fuel cell 2. This can be required for example in order to protect a component of the fuel cell 2, such as for example the electrolyte 10 from overheating. The respective temperature of the fuel cell 2 can be regulated through cold bypass air, which is fed to the fuel cell air in order to reduce its temperature. The cold ambient air in this case can be fed to the second section 12" of the fuel cell air line 12 via the bypass air line 24, wherein the bypass air line 24 bypasses the residual gas heat transfer unit 14. However, if for example during the starting operation the additional burner 20 is still active, the additional heat transfer unit 23 arranged in the bypass air line 24 also has to be bypassed in order to be able to achieve cooling of the fuel cell air. The bypass line 72 is used for this purpose. The cooling air then flows via the first section 24' of the bypass air line 24 as far as to the bypass line 72 and from the bypass line 72 into the second section 12' of the fuel cell air line 12. The cooling air thus bypasses the residual gas heat transfer unit 14 on the one hand and the additional heat transfer unit 23 on the other hand.

The supply of the additional burner 20 with air is effected via an additional air delivery device 27 and a corresponding air supply line 28. The additional delivery device 27 can preferentially be equipped with a filter device 75 in order to filter particles and/or aerosols out of the delivered air. The air for the additional burner 20 in this case is preferably drawn in from surroundings 52 of the fuel cell system. The supply of the additional burner 20 with fuel is effected with the help of a fuel delivery device 29 via a corresponding fuel line 30. The fuel can for example be any hydrocarbons. However, preferred is a fuel with which for example a combustion engine of the vehicle equipped with the fuel cell system 1 is also operated. In particular, this fuel is thus diesel or biodiesel or fuel oil. Petrol or natural gas or any biofuel as well as synthetic hydrocarbons are used as an alternative. Consequently, the fuel line 30 is practically connected to a fuel tank 53 of the vehicle which is not shown in more detail here.

The additional burner 20 and the additional heat transfer unit 23 in this case are part of an additional burner module 31 which comprises a thermally insulating envelope 32 in which the additional burner 20 and the additional heat transfer unit 23 are arranged. In addition to this, the additional air delivery device 27 and the fuel delivery device 29 of the additional burner 20 are part of the additional burner module 31 in the example. However, these parts are arranged outside the associated envelope 32.

In the shown example, the fuel cell system 1 is additionally equipped with a reformer 33, which in operation sub-stoichiometrically converts air with a reformer fuel or fuel, i.e. at an air ratio<1, in the process generating hydrogen-containing and carbon monoxide-containing reformate gas. This reformate gas is fed as anode gas to the anode side 6 of the fuel cell 2 via the reformate gas line 11. To supply the reformer 33 with reformer air, a reformer air line 34 is provided, which in this case is likewise fed by the air delivery device 17. In addition to this, with the embodiment shown here, a further delivery device 35 is arranged in the reformer air line 34 downstream of the air delivery device 17, which in the following is designated reformer air delivery device 35. With the help of this reformer air delivery device 35, the air fed to the reformer 33 can be brought to an elevated pressure level. In addition to this, this reformer air delivery device 35 can be equipped as hot gas delivery device. For example, it can be equipped in the manner of a blower, compressor, electrically operated turbocharger or a pump.

For supplying the reformer 33 with fuel, a fuel delivery device 36 is provided, which feeds a suitable fuel to the reformer 33 via a corresponding fuel line 37. This can again be any hydrocarbon. Preferred is that fuel which is also fed to the combustion engine of the vehicle equipped with the fuel cell system 1. Accordingly, the fuel line 37 provided for supplying the reformer 33 is also practically connected to the tank 53 of the vehicle.

The reformer 33 contains a combustion chamber 38 or mixing chamber 38 in which the reformer air and the fuel are intermixed or combusted. The reformer 33 additionally contains a catalytic converter 40, with the help of which the reformate gas is generated by means of partial oxidation.

The reformer 33 is part of a reformer module 41, which comprises a separate or own thermally insulating and/or gas-tight envelope 42, in which the reformer 33 is arranged. In the example, the reformer fuel delivery device 36 belongs to the reformer module 41. Said delivery device 36 however is arranged outside the envelope 42 of the reformer module 41 for this purpose.

The burner waste gas line 13 or waste gas line 13 in brief contains an oxidation catalytic converter 43 for exhaust gas retreatment downstream of the residual gas heat transfer unit 14. In addition, a heating heat transfer unit 44 can be incorporated in the waste gas line 13, which in operation can heat up a fluid flow 45 indicated by an arrow. This can be an airflow 45, which can be fed to a vehicle interior which is not shown here. Alternatively, the fluid flow 45 can also be a coolant of a cooling circuit, wherein the cooling circuit contains a heat transfer unit for heating an airflow, which can then be conducted for example to the vehicle interior. The heating heat transfer unit 44 in this case is practically arranged downstream of the oxidation catalytic converter 43. Because of this, the heat liberated in the oxidation catalytic converter 43 when converting pollutants if applicable can be utilized for heating the vehicle interior.

The removal point 25, at which the bypass airline 24 branches off the fuel cell air line 12, is practically configured as valve or arranged on a valve 46. This valve 46 makes possible for example a quasi random distribution of the airflow delivered by the air delivery device 17 over the section of the fuel cell air line 12 conducted through the residual gas heat transfer unit 14 and over the bypass air line 24. The valve 26 is practically part of a valve device 47, which divides the air delivered on the pressure side by the air delivery device 17 over the fuel cell air line 12 and over the reformer air line 34 via a distribution strip 48. For controlling the air rate fed to the reformer 33, a further valve 49 can be provided, which can likewise belong to the valve device 47. Furthermore, a cooling gas line or cooling air line 50 is provided in the example, via which cooling air can be fed to the residual gas burner 3. The cooling air line 50 can be controlled with a valve 51, which in the example likewise belongs to the valve device 47. The air delivery device 17 likewise draws the air from the surroundings 52 of the fuel cell system 1 via a suction line 53. The valve device 47 in the example is likewise part of the air supply module 18 and in this case is arranged within the associated envelope 19.

The valves of the valve device 47 and the air delivery devices 17, 35 are preferably temperature-controlled or temperature-regulated. For example, the valve 49, the delivery device 17 and the reformer air delivery device 35 are regulated as a function of the temperature of the mixing chamber 38 and/or as a function of the temperature of the catalytic converter 40. The valve 51 and the air delivery device 17 can be regulated for example as a function of the temperature of the combustion chamber 9. The valve 46 and the air delivery device 17 can be regulated for example as a function of the temperature of the cathode side 8. The air delivery device 35 can be regulated for example as a function of the temperature of the mixing chamber 38 and/or as a function of the temperature of the catalytic converter 40.

The electric current generated with the help of the fuel cell system 1 practically serves for supplying electrical consumers with electric current or with electric energy. The arrangement 0 in this case comprises a network system 54, comprising a network system battery 82 and initial consumers 78, which are electrically supplied via a network system voltage of the network system battery 82. The arrangement 0 can for example be part of a vehicle, in particular of a motor vehicle. In this case, the network system 54 corresponds for example to the on-board system 54 of the vehicle while the network system battery 82 corresponds to an on-board system battery 82 of the vehicle. The network system voltage of the network system battery 82 is at a network system voltage level, which in the case of a vehicle can for example amount to 12V. The initial consumers 78 are for example control units, glow bulbs and a radio of the vehicle.

A cell voltage at a cell voltage level can be tapped off the electrodes 4 of the fuel cell 2. The cell voltage level in the shown embodiment is for example at 42V and can in particular fluctuate for example between 36V and 60V depending on a loading of the fuel cell 2. However, the cell voltage level can have any value in particular dependent on the design and the loading of the fuel cell 2.

The fuel cell system 1 is additionally equipped with an energy storage unit 56 designed as system battery 56, on which a system voltage at a system voltage level is present, wherein the system voltage level for example has a value of 24V. The system battery 56 in particular serves the purpose of storing the cell voltage generated by the fuel cell 2 or an electric energy connected therewith. To this end, a charging device 79 is electrically connected to the system battery 56. Feeding the cell voltage of the fuel cell 2 to the system battery 56 or to the charging device 79 is effected via a voltage converter device 57 of the fuel cell system 1. The voltage converter device 57 to this end is arranged between the fuel cell 2 and the system battery 56 or the charging device 79 and is electrically connected to these. In order to render the cell voltage of the fuel cell 2 capable of being fed to the system battery 56, the voltage converter device 57 converts the cell voltage at the cell voltage level to the system voltage that is at the lower system voltage level. The voltage converter device 57 thus converts for example the cell voltage of 42V into a voltage of 24V, which corresponds to the system voltage. In order to render the system voltage that is present on the system battery 56 capable of being fed also to the fuel cell 2, in particular to the electrodes 4 and the anode 95 of the fuel cell 2, the voltage converter device 57 is additionally designed accordingly. Here, the voltage converter device 57 is capable if required to convert the system voltage at the system voltage level into another voltage at another voltage level and subsequently feeding it to the fuel cell 2. This serves the purpose in particular to protect the anode 95 from oxidation. The oxidation in this case is relevant in particular with oxidizing conditions on the anode side 6, wherein the fuel cell system 1 on the one hand can have a device for determining the relevant conditions and on the other hand is preferentially designed in such a manner that the electric voltage present on the electrodes 4 can be regulated.

The system voltage present on the system battery 56 can be additionally fed to system consumers 80 of the fuel cell system 1. This means that the system battery 56 functions as an electric buffer or an electric storage unit, via which the electric supply of system consumers 80 is effected. As system consumers 80, the delivery devices 17, 27, 29, 35, 36, the valves 46, 49, 51, 67, 74, 76 and ignition devices, such as for example glow pins and spark plugs, with which a combustion reaction can be initiated in the residual gas burner 3, in the additional burner 20 and in the reformer 33 are employed for example. Likewise, a control device 55 with the help of which the individual components of the fuel cell system 1 can be actuated for example as a function of temperatures, pressures, electric currents etc. of the fuel cell system, can represent a system consumer 80 of the fuel cell system 1, wherein the system consumers 80 are operated at the system voltage level, i.e. for example at 24V. The electric energy of the system battery 56 stored in the form of the system voltage can be utilized in this case for starting the fuel cell system 1 without external electric energy or voltage supply.

In order to render the system voltage present on the system battery 56 capable of being fed to or utilized by the network system 54, in particular for the network system battery 82 of the network system 54, a consumer voltage converter 77 is additionally provided, which converts the system voltage of the system battery 56 at the system voltage level to the onboard system voltage or network system voltage at the network system voltage level, feeding it to the network system battery 82. In the shown embodiment, the network system voltage level is lower than the system voltage level. The consumer voltage converter 77 is consequently designed as downward converter and reduces the system voltage level to the network system voltage level. For supplying initial consumers 78 of the network system 54 with the system voltage, a charging device 79 is additionally arranged on the network system battery 82, wherein the charging device 79 in the shown example is integrated in the network system battery 82. The network system battery 82 thus functions similarly to the system battery 56 as buffer or storage unit, via which an electric supply of the initial consumers 78 is effected. The cell voltage generated by the fuel cell 2 and the system voltage present on the system battery 56 and the system network voltage of the network system 54 are usually direct voltages. That, in order to avoid the polarity of these voltages changing over time. Practically, the voltage converter device 57 and the consumer voltage converter 77 each comprise a direct voltage converter 83.

For the supply of electrical secondary consumers 84, 85, which are operated with an additional voltage at least one additional voltage level through the system battery 56, at least one additional voltage converter 86 is additionally provided. In the shown embodiment, two additional voltage converters 86', 86" are provided, which convert the system voltage level to two different additional voltage levels, wherein both additional voltage levels are higher than the system voltage level. The additional voltage converters 86', 86" are thus designed as upward converters 86', 86".

The first additional voltage converter 86' converts the system voltage of the system battery 56 at the system voltage level into the first additional voltage at the higher first additional voltage level. As secondary consumers 84, in this case external electrical consumers, for example a refrigerator, a cooler box, a TV set and a coffee maker, which usually require an additional voltage level of 110 V or 220 V and are additionally operated with an alternating voltage, are mentioned here. To this end, the first additional voltage converter 86' comprises an inverter 87. In other words, in addition to increasing the system voltage to the first additional voltage level, the first additional voltage converter 86' converts the direct voltage-like system voltage of the system battery 56 into the alternating voltage-like first additional voltage, making it available to the relevant electrical secondary consumers 84.

The second additional voltage converter 86" converts the system voltage of the system battery 56 at the system voltage level into a second additional voltage level, wherein the voltage thus converted for example corresponds to a high voltage, i.e. a voltage higher than 300 V. Thus, the second additional voltage level is higher than the first additional voltage level of the first additional voltage converter 86'. As secondary consumers 85 at the second additional voltage level made available by the second additional voltage converter 86", air conditioning devices, in a vehicle therefore an air conditioner of the vehicle, are electrically supplied in particular.

The additional exhaust gas line 21 with the embodiments shown here is connected to the exhaust line 13 via an introduction point 60, namely downstream of the residual gas heat transfer unit 14. Here, this introduction point 60 is practically positioned so that it is located upstream of the oxidation catalytic converter 43. Because of this, the residual heat of the additional burner waste gas can be utilized for heating the oxidation catalytic converter 43. At the same time, the residual heat of the additional burner waste gas can be utilized for heating the heating heat transfer unit 44.

The fuel cell system 1 comprises a reformer feeding device 88, which is coupled to the reformer 33 in a heat-transferring manner. This heat transfer is realized via an inflow 89 of the reformer feeding device 88, a heating jacket 90 through which a flow can flow and a return 91 of the reformer feeding device 88. Here, the inflow 89 is fluidically connected on the one end upstream of the additional heat transfer unit 23 to the additional exhaust line 21 and on the other end via a first opening 97 of the heating jacket 90 to the heating jacket 90. The heating jacket 90 is designed in a manner capable of being subjected to a throughflow and coupled to the reformer 33 in a heat-transferring manner. In addition, the heating jacket 90 is fluidically separated or insulated from the reformer 33. The heating jacket 90 through which a flow can flow additionally comprises a hollow space fluidically connected to the first opening 97. The additional burner waste gas conducted to the heating jacket 90 via the inflow 89 from the additional waste gas line 21 thus flows through the first opening 97 into the heating jacket 90, in particular into the hollow space of the heating jacket 90, without entering the reformer 33 in the process. Furthermore, the return 91 of the reformer feeding device 88 is fluidically connected on the one end to the heating jacket 90 through a second opening 98 of the heating jacket 90 and on the other end downstream of the additional heat transfer unit 23, to the additional waste gas line 21. The additional burner waste gas of the additional burner 20 which flowed through the inflow 89 into the heating jacket 90, in particular into the hollow space of the heating jacket 90, consequently flows back through the return 91 of the reformer feeding device 88 to the additional waste gas line 21. Thus, the heating jacket 90, in particular the hollow space of the heating jacket 90, is subjected to the through-flow of warm additional burner waste gas and the heat of the additional burner waste gas of the additional burner 20, transferred to the reformer 33. A shut-off organ 94 for decoupling the additional burner 20 from the heating jacket 90 during the normal operation of the fuel cell system 1 is additionally arranged in the inflow 89.

Figure 2:
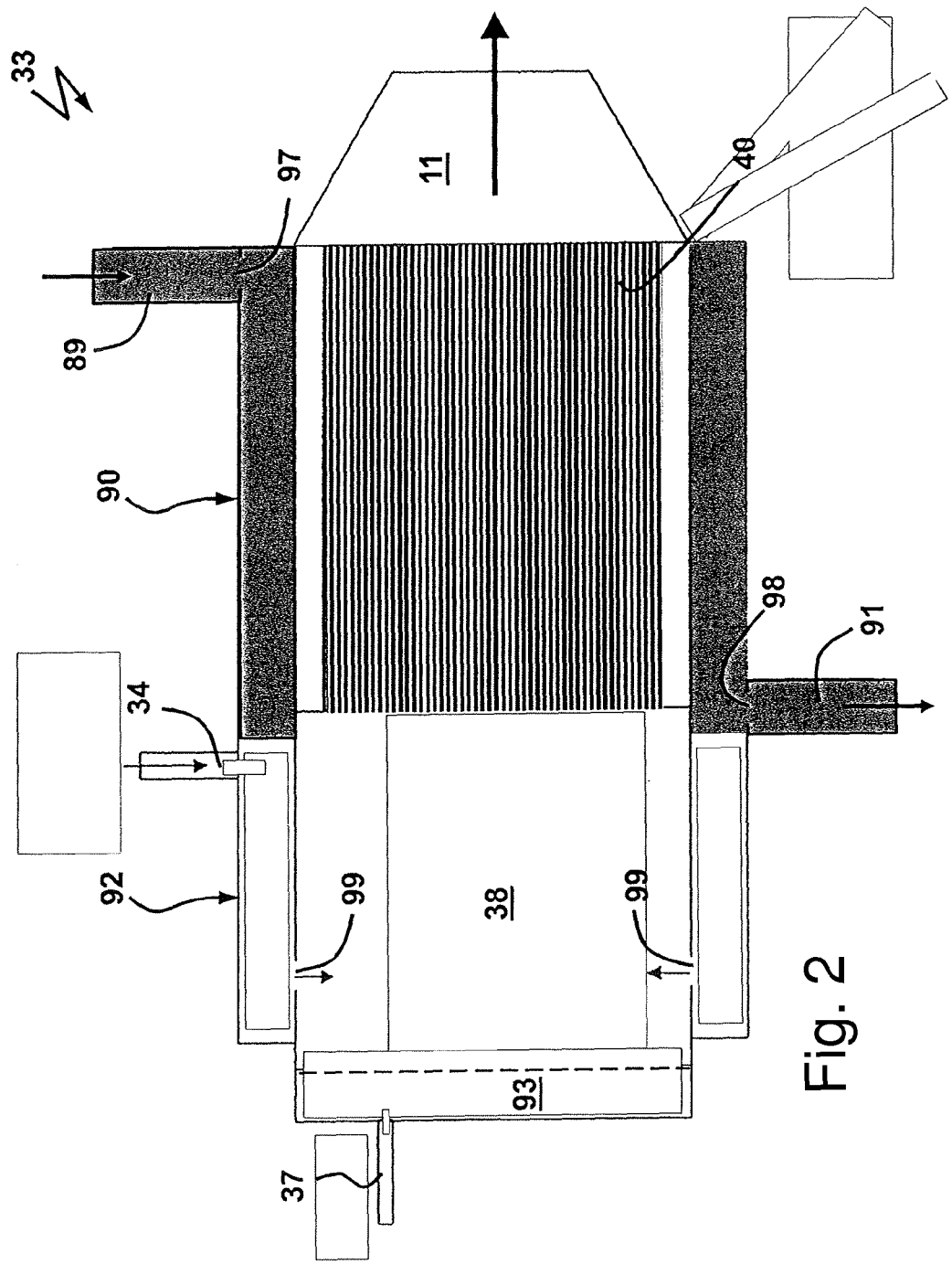
FIG. 2 is a schematic sectional through a reformer according to the invention.

The heating jacket 90 surrounds the reformer 33 in the region of the catalytic converter 40. The first opening 97 of the heating jacket 90, as shown in the section of FIG. 2, is arranged on the side of the heating jacket 90 facing away from the mixing chamber 38, while the second opening 98 is arranged on the side of the heating jacket 90 facing the mixing chamber 38, so that the additional burner waste gas circulates in the heating jacket 90, and has as long as possible a flow path. The mixing chamber 38 is surrounded by a mixing jacket 92 adjacent to the heating jacket 90. The mixing jacket 92 comprises a cavity and is fluidically connected to the reformer air line 34 on its side facing away from the reformer 33, while on its side facing the reformer 33, it comprises mixing jacket outlets 99, which fluidically connect the mixing jacket 92 to the mixing chamber 38. Thus, the reformer air flows via the mixing jacket 92 into the mixing chamber 38 of the reformer 33, wherein in the mixing jacket 92 a preconditioning can take place. An even distribution of the mixing jacket outlets 99 along the circumference of the mixing jacket 92 additionally ensures the even inflow of the reformer air in the mixing chamber 38.

The reformer 33 shown here furthermore comprises an evaporator chamber 93, which is fluidically connected to the fuel line 37. Accordingly, the fuel flows via the evaporator chamber 93 into the mixing chamber 38, wherein the evaporator chamber 93 serves the purpose of evaporating the mostly liquid fuel prior to entering the mixing chamber 38. The evaporator chamber 93, the mixing chamber 38 and the catalytic converter 40 are consequently fluidically interconnected.

Additionally or alternatively, a branch 100 branched off the additional waste gas line 21 can be coupled in a heat-transferring manner to an end plate 101 of the fuel cell 2. In the shown example, the branch 100 is connected to a removal point 102 arranged on the valve 94 of the inflow 89 and conducts the additional burner waste gas to the end plate 101 and subsequently back to the return 91 of the reformer feeding device 88 via an introduction point 103, by way of which the additional burner waste gas gets back into the additional waste gas line 21. It is thus also possible to heat the fuel cell 2 with the help of the additional burner 20. The removal point 102 arranged on the valve 94 in this case allows quasi any distribution of the additional burner waste gas for heating the reformer 33 or the fuel cell 2.

Typically, the fuel cell 2 can have a stack-like construction, wherein a multiplicity of plate-shaped fuel cell elements are stacked on top of one another and thus form a fuel cell stack or stack. At its ends, the fuel cell stack is closed off by two end plates, namely said end plate 101 and by a further end plate. This further end plate in the example comprises an anode gas connection 61, to which the anode gas line 11 or reformate gas line 11 is connected, a cathode gas inlet 62, to which the cathode gas line 12 or fuel cell air line 12 is connected, an anode waste gas outlet 63, to which the anode waste gas line 5 is connected, and a cathode waste gas outlet 64, to which the cathode waste gas line 7 is connected. Since all educt connections are thus arranged on this further end plate, it can also be designated connection plate. In contrast with this, the other end plate 101 merely forms a termination of the fuel cell stack, so that it can also be designated termination plate.

With another embodiment, a further envelope can be arranged in the thermally insulating envelope 16 of the fuel cell module 15, which in particular is of a gas-tight design. This inner envelope can likewise act in a thermally insulating manner. It is likewise possible as an alternative, to configure the outer envelope 16 in a gas-tight manner. Furthermore, an envelope can be adequate if it is designed in a thermally insulating and gas-tight manner. In particular, it is now possible to connect the previously mentioned branch 100 of the additional waste gas line 21 to an interior of the fuel cell module 15 enclosed by the inner envelope. Here, the branch 100 leads into said interior at an entry point and exits the interior again at an exit point distant there from. Because of this, the fuel cell module 15 can be heated with the additional burner waste gas. In particular, this can be combined with the heating of the fuel cell 2, for example the additional burner waste gas can be initially conducted via the branch 100 as far as to the termination plate and from the latter exit into the interior in order to be discharged again from the interior via the exit point.

The fuel cell system 1, with the preferred embodiment shown here, is furthermore equipped with a recirculation line, which is connected at the inlet side to the anode waste gas line 5 and to the reformer air line 34 on the outlet side via an introduction point 66, namely upstream of the reformer air delivery device 35. Since the returned anode waste gas in operation of the fuel cell system 1 can have comparatively high temperatures, the reformer air delivery device 35 is practically configured for being loaded with hot gases, wherein these gases can be additionally toxic and/or explosive.

The valve device 47 in the example is designed to distribute the air drawn in by the air delivery device 17 over the fuel cell air line 12, over the bypass air line 24, over the cooling air line 50 and over the reformer air line 34 on the pressure side.

With another embodiment that is not shown, the air delivery device 17 can be additionally used for the air supply of the additional burner 20 via the valve device 47. To this end, a distribution strip 48 can be connected to the additional burner air line 28 via a further valve. Alternatively, the additional air delivery device 27 in the additional burner air line 28 can also be omitted.

In addition to the preheating of the fuel cell air with the help of the additional burner 20, a residual gas circulation in a circulation circuit 68 can be realized during a cold start of the fuel cell system 1, wherein in particular the reformer 33 is also at ambient temperature, which circuit is indicated in FIG. 1 by an interrupted line.

Furthermore, an additional bypass line 69 is provided, which branches off the reformate gas line 11 and bypasses the anode side 6 of the fuel cell 2. Because of this it is possible to heat up the reformer 33 in a material-saving manner, without running the risk of damaging the anode 95 through residual oxygen from the reformer 33. In the example, this bypass line 69 is connected to the anode waste gas line 5, so that reformer waste gas is re-introduced into the original path upstream of the residual gas burner 3. The bypass line 69 can be controlled with a suitable valve 70. Practically, the bypass line 69 is designed to this end so that its through-flow resistance is lower than the through-flow resistance of the anode side 6 of the fuel cell 2. With opened valve 70, the reformer waste gas then flows, following the path of least resistance, not through the anode side 6, but through the bypass line 69. With this version, the reformer 33 can easily be operated over-stoichiometrically, since no contact of the anode side 6 with residual oxygen in the reformer waste gas has to be expected. This quasi random over-stoichiometrical operating mode of the reformer 33 simplifies the starting operation of the reformer 33, in particular for maintaining lower temperatures.

While specific embodiments of the invention have been shown and described in detail to illustrate the application of the principles of the invention, it will be understood that the invention may be embodied otherwise without departing from such principles.

What is claimed is:

1. A fuel cell system comprising:
   a fuel cell, said fuel cell comprising an anode side and a cathode side;
   a reformer generating reformate gas;
   a fuel line supplying said reformer with reformer fuel;
   a reformer air line supplying said reformer with reformer air;
   a reformate gas line for feeding the reformate gas to said anode side;
   a reformer heating burner device generating reformer heating burner waste gas; and
   a reformer feeding device coupled to said reformer and transferring heat of said reformer heating burner waste gas to said reformer, wherein said reformer heating burner waste gas is formed separate from said reformate gas.

2. The fuel cell system according to claim 1, wherein:
said reformer feeding device comprises an inflow for feeding the reformer heating burner waste gas to said reformer; and
said reformer feeding device comprises a return for returning the reformer heating burner waste gas from said reformer, said reformer feeding device comprising a reformer feed line extending from said reformer heating burner device to said reformer, said reformer heating burner device being located at a spaced location from said reformer, said reformate gas line extending from said reformer to said anode side.

3. The fuel cell system according to claim 2, further comprising a heating jacket through which a fluid flow can pass, wherein:
said reformer is at least partially surrounded by said heating jacket; and
said heating jacket is coupled to said reformer in a heat-transferring manner, said reformer receiving said reformer heating burner waste gas such that said reformer heating burner waste gas does not mix with said reformate gas.

4. The fuel cell system according to claim 3, wherein said reformer comprises a mixing chamber and a catalytic converter; and
said heating jacket surrounds said reformer in a region of said catalytic converter.

5. The fuel cell system according to claim 4, wherein:
said reformer comprises a mixing jacket;
an outside of said mixing jacket, facing away from said reformer, is fluidically connected to said reformer air line; and
an inside of said mixing jacket, facing said reformer is fluidically connected to a mixing chamber of said reformer by means of at least one mixing jacket outlet.

6. The fuel cell system according to claim 5, wherein said mixing jacket has a plurality of mixing jacket outlets distributed along a circumferential direction of said reformer.

7. The fuel cell system according to claim 3, wherein said heating jacket is fluidically separated from said reformer.

8. The fuel cell system according to claim 2, further comprising:
an reformer heating burner waste gas line connected to said reformer heating burner device; and
a fuel cell system branch branching off said reformer heating burner waste gas line or branching off said reformer feeding device, said reformer heating burner waste gas line being coupled to said fuel cell in a heat-transferring manner.

9. The fuel cell system according to claim 1, further comprising a fuel cell air line feeding cathode gas to said cathode side.

10. The fuel cell system according to claim 1, further comprising:
a reformer heating burner waste gas line connected to said reformer heating burner device; and
a reformer heating burner heat transfer unit, wherein reformer heating burner waste gas is fed to said reformer heating burner heat transfer unit via said reformer heating burner waste gas line.

11. The fuel cell system according to claim 10, further comprising a heating jacket through which a fluid flow can pass, wherein:
said reformer is at least partially surrounded by said heating jacket;
said heating jacket is coupled to said reformer in a heat-transferring manner wherein:
said reformer feeding device comprises an inflow for feeding the reformer heating burner waste gas to said reformer;
said inflow is fluidically connected, at one end, to said reformer heating burner waste gas line, upstream of said reformer heating burner heat transfer unit; and
said inflow is fluidically connected, at another end, to said heating jacket.

12. The fuel cell system according to claim 10, wherein:
said reformer feeding device comprises a return for returning the reformer heating burner waste gas from said reformer; and
said return is fluidically connected, at one side, to said reformer heating burner waste gas line, downstream of said reformer heating burner heat transfer unit; and
said return is fluidically connected, at another side, to said heating jacket.

13. The fuel cell system according to claim 1, further comprising:
a first fuel line supplying said reformer heating burner with reformer heating burner fuel; and
a second fuel line supplying said reformer with a reformer fuel, wherein the reformer fuel corresponds to the reformer heating burner fuel.

14. A reformer for a fuel cell system, the reformer comprising:
a reformer generating reformate gas, said reformer comprising a reformer combustion element;
a fuel line supplying said reformer with reformer fuel;
a reformer air line supplying the reformer with reformer air;
a reformate gas line for feeding the reformate gas to said anode side;
a reformer heating burner device generating additional burner waste gas, said reformer heating burner device being located at a spaced location from said reformer;
a reformer feeding device coupled to said reformer and transferring heat of said additional burner waste gas to said reformer; and
a heating jacket through which a fluid flow can pass, wherein said reformer is at least partially surrounded by said heating jacket, said heating jacket defining at least a portion of a chamber, said chamber receiving said additional burner waste gas, wherein said chamber is not in fluid communication with said reformate gas, said reformer feeding device comprising a feed line extending from said reformer heating burner device to said reformer, said reformate gas line extending from said reformer to said anode side, said heating jacket being coupled to said reformer in a heat-transferring manner.

15. The reformer according to claim 14, wherein said reformer comprises a mixing jacket and/or an evaporator chamber.

16. A fuel cell system comprising:
a fuel cell, said fuel cell comprising an anode side with an anode and a cathode side with a cathode;
a residual gas burner receiving anode waste gas and cathode waste gas and generating burner waste gas and heat;
a reformer generating reformate gas;
a fuel line supplying said reformer with reformer fuel;
a reformer air line supplying said reformer with reformer air;
a reformate gas line for feeding the reformate gas to said anode side;
an additional burner device generating additional burner waste gas and heat, said additional burner device being located at a spaced location from said reformer;

a reformer feeding device coupled to said reformer and transferring heat of said additional burner waste gas to said reformer; and a heating jacket through which a fluid flow can pass, wherein said reformer is at least partially surrounded by said heating jacket, said heating jacket defining at least a portion of a chamber, said chamber receiving said additional burner waste gas, said chamber being sealed such that said additional burner waste gas is separate from said reformate gas, said heating jacket being coupled to said reformer in a heat-transferring manner.

17. The fuel cell system according to claim 16, wherein:

said reformer comprises a mixing chamber and a catalytic converter;

said heating jacket surrounds said reformer in a region of said catalytic converter.

said reformer comprises a mixing jacket;

an outside of said mixing jacket, facing away from said reformer, is fluidically connected to said reformer air line; and an inside of said mixing jacket, facing said reformer is fluidically connected to a mixing chamber of said reformer by means of at least one mixing jacket outlet, said reformer feeding device comprising a feed line extending from said reformer heating burner device to said reformer, wherein said chamber receives said additional burner waste gas and heat via said feed line, said reformate gas line extending from said reformer to said anode side.

18. The fuel cell system according to claim 16, further comprising:

an additional burner waste gas line connected to said additional burner device;

a fuel cell system branch branching off said additional burner waste gas line or branching off said reformer feeding device, said additional burner waste gas line being coupled to said fuel cell in a heat-transferring manner, wherein:

said reformer feeding device comprises an inflow for feeding the additional burner waste gas to said reformer; and said reformer feeding device comprises a return for returning the additional burner waste gas from said reformer.

\* \* \* \* \*